(12) United States Patent
Plewinski et al.

(10) Patent No.: US 8,707,256 B2
(45) Date of Patent: Apr. 22, 2014

(54) SYSTEM FOR WRITING A SIMULATION PROGRAM

(75) Inventors: Nicolai Plewinski, Röthenbach/Pegnitz (DE); Thilo Stolper, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1102 days.

(21) Appl. No.: 12/673,685

(22) PCT Filed: Aug. 16, 2007

(86) PCT No.: PCT/EP2007/007263
§ 371 (c)(1),
(2), (4) Date: Feb. 16, 2010

(87) PCT Pub. No.: WO2009/021541
PCT Pub. Date: Feb. 19, 2009

(65) Prior Publication Data
US 2011/0010689 A1 Jan. 13, 2011

(51) Int. Cl.
*G06F 9/44* (2006.01)
(52) U.S. Cl.
USPC .......................................................... 717/108
(58) Field of Classification Search
CPC ..................... G05B 17/02; G05B 2219/32337; G05B 2219/32339; G05B 2219/32352
USPC ....................................................... 717/108
See application file for complete search history.

(56) References Cited

U.S. PATENT DOCUMENTS

| 7,266,476 | B2 * | 9/2007 | Coburn et al. | 717/135 |
| 7,571,082 | B2 * | 8/2009 | Gilpin et al. | 717/120 |
| 8,019,583 | B1 * | 9/2011 | Sturrock et al. | 703/13 |

(Continued)

FOREIGN PATENT DOCUMENTS

| EP | 1 265 333 | 12/2002 |
| WO | WO 02/079974 | 10/2002 |

OTHER PUBLICATIONS

Chen et al., "Component-Oriented Simulation Architecture: Toward Interoperability and Interchangeability", 2001, Winter Simulation Conference.*

(Continued)

*Primary Examiner* — Wei Zhen
*Assistant Examiner* — Junchun Wu
(74) *Attorney, Agent, or Firm* — Cozen O'Connor

(57) ABSTRACT

The invention relates to a system for writing a simulation program for simulating an automation installation. To facilitate the writing of a simulation program for a complex automation installation, the system comprises: means for defining a respective resource object for at least two components of the automation installation, means for defining port data for each port, which define characteristics of the values which can be interchanged on the associated port, means for identifying a first port of a first resource object, which is provided for interchanging values with a second port of a second resource object, on the basis of the port data associated with the first and second ports, means for defining precisely one variable which can be engaged with the values to be interchanged between the first and second ports, and means for integrating the program fragments associated with the first and second resource objects into the simulation program and for engaging the variables with the values to be interchanged between the first and second ports.

10 Claims, 4 Drawing Sheets

(56) References Cited

U.S. PATENT DOCUMENTS

| | | |
|---|---|---|
| 8,291,121 B2 * 10/2012 | Papadopoulos et al. | 709/250 |
| 2004/0059553 A1 * 3/2004 | Heidemann et al. | 703/6 |
| 2004/0193640 A1 * 9/2004 | Armstrong et al. | 707/103 R |
| 2004/0230945 A1 * 11/2004 | Bryant et al. | 717/106 |
| 2005/0119767 A1 * 6/2005 | Kiwimagi et al. | 700/19 |
| 2005/0192684 A1 * 9/2005 | Friedrich et al. | 700/83 |
| 2006/0206873 A1 * 9/2006 | Argade | 717/135 |
| 2006/0282248 A1 * 12/2006 | Kageyama et al. | 703/13 |
| 2007/0088533 A1 4/2007 | Kazuaki | |
| 2009/0089234 A1 * 4/2009 | Sturrock et al. | 706/45 |
| 2010/0332006 A1 * 12/2010 | Heuschmann et al. | 700/98 |

OTHER PUBLICATIONS

Vries et al. "Message exchange in the building industry", 1995, Elsevier Science B.V.*

McLean et al. "The Expanding Role of Simulation in Future Manufacturing", 2001, Winter Simulation Conference.*

Caughlin, "Automating the metamodeling process", Dec. 1997, IEEE.*

* cited by examiner

SYSTEM FOR WRITING A SIMULATION PROGRAM

CROSS-REFERENCE TO RELATED APPLICATIONS

This is a U.S. national stage of International Application No. PCT/EP2007/007263, filed on 16 Aug. 2007.

BACKGROUND OF THE INVENTION

1. Field of the Invention

The invention relates to simulators and, more particularly, to a system for writing a simulation program for simulating an automation technology installation.

2. Description of the Related Art

The structure of automated process control or manufacturing installations has become very complex consists of a plurality of components interacting with each other. Here as well as throughout the document all components participating in the automation process are to be understood as components of an automation installation. Thus, in this aspect, it is to be understood that the sensors and actors involved in the automation process belong to the installation components. In addition, the workpieces processed by such an automation installation are to be understood as components of the installation.

Because of the plurality and the complexity of the components involved in an automation process, the software provided for controlling the components generally also exhibits a very high degree of complexity. In the final analysis, this gives rise to the aim, with newly developed installations or process-related modifications of existing installations, of being able to test the control software before the system is put into operation. This is generally performed by the automation installation and the real controllers being simulated with the software to be tested. As well as significant savings in costs and time, this brings the advantage, when a new automation installation is being developed, of the installation not yet having to exist when the control software is to be developed and tested. With the aid of a computer, the mechanical components of the automation installation are simulated. As a result, meaningful input signals are created for the output signals generated by the control program.

Generally, normal simulation programs provide behavior models with which the behavior of individual installation components can be simulated. With the aid of these behavior models, it is possible, independently of predetermined input values, which as a rule are generated from the models of other components involved in the automation process, to compute output values and make these available in their turn to other components of the automation installation or to its behavior models as an input value. In a graphical user interface of such a simulation program, the individual real installation components are thus represented as a rule by graphical symbols having inputs and outputs which can be given corresponding input and output values. In order to now simulate an automation technology installation with many individual components, the user will connect together the graphical objects which are assigned to the respective components via the inputs and outputs to simulate the flow of information within the real installation. The more complex the automation technology installation to be modeled is, the more difficult and error prone is the generation of a simulation model for the complete automation technology installation.

SUMMARY OF THE INVENTION

It is therefore an object of the invention is to simplify the creation of a simulation program for a complex automation technology installation.

This and other objects and advantages are achieved by a system for writing a simulation program for simulating an automation installation including means for defining of a respective resource object for at least two components of the automation installation with each of these resource objects being assigned a program fragment with computer program code for simulating the functionality of the associated components and with each of these resource objects having at least one port of which the value can be given by the program fragment of the associated resource object and/or can be read in, means for defining port data for each port which defines properties of values able to be interchanged at the associated port, means for identifying a first port of a first resource object which is provided for interchange of values with a second port of a second resource object based on port data belonging to the first and second port, means for defining exactly one variable which can be assigned the values to be exchanged between the first and the second port, and means for integrating the program fragments assigned to the first and second resource object into the simulation program and for assigning to the variables the values to be interchanged between the first and the second port.

The invention is based on the knowledge that the connection of the input and output of the graphical objects that represent the real components of the installation in a simulation environment can be significantly simplified or even automated if the ports to be connected to one another are sufficiently characterized by suitable Meta information or meta data.

In accordance with the invention, a component of the automation installation is assigned a resource object, with each of these resource objects being assigned the Meta information or meta data in the form of the port data. The port data assigned to a resource object will be created for each port of the resource object and identifies the data that is able to be interchanged through the respective port. Such an identification goes far beyond the pure definition of a permitted data type, since it is intended to make possible an automatic assignment of inputs and outputs of different resource objects compatible with each other. The system comprising corresponding means with which the ports to be connected for exchange of values can be determined on the basis of the port data. In this way, a manual "wiring" of the inputs and outputs of these behavior model presentations is dispensed with.

In addition, each resource object contains a program fragment in which code is stored which simulates the installation components belonging to the resource object or its behavior respectively, provided this code is executed by a suitable simulation program.

In accordance with the invention, as soon as the ports provided for mutual interchange of values have been identified, a variable is defined to which the identified ports have access and which can be given assigned values by these identified ports. In addition, the corresponding port can naturally also read out values from this variable for execution of their program fragments.

Finally, the simulation program which is suitable for simulation of the complete automation installation is generated or expanded such that the program fragments assigned to the identified resource objects are merged into one common program. Within this program, the previously defined variables can finally be occupied or read out by the program fragments. In accordance with the invention, a local variable defined within the program fragments is mapped for this purpose onto the defined variable.

The system in accordance with the invention advantageously offers the user with the ability to define a behavior model of individual installation components in isolation from one another and, when connecting them together into an overall model of the automation installation, he is given considerable help by the system. This is made possible by providing the user with the opportunity to describe the ports of the individual resource objects with corresponding Meta data, i.e., the port data, such that the system, by evaluating this port data, is in a position to autonomously perform the correct connection of the individual resource objects. As a result, a much clearer presentation is provided of the installation model, particularly with very complex structures of automation installations, than is known from the prior art, in which graphical objects are wired to one another at their input and output in a single presentation.

For the variables intended for interchange of values a number of different programmed technical realization options exist. Accordingly, in a first advantageous embodiment of the invention the variable can be a global variable.

Especially when a plurality of similar components is provided within the automation installation, an especially advantageous embodiment of the invention is provided in which the variable is a globally-defined array. In this case, input or outputs of different instances of a resource object of the same type can be linked to different entries of one and the same array.

Instead of a global variable, in a further advantageous embodiment, the variable can also be a pointer.

In a further advantageous embodiment, especially in the event of a number of resource objects of the same type, the variable is a list.

To make it possible to map the values of locally-defined variables given for or read into the individual program fragments to the variables provided for the interchange of values in a unique manner, in a further advantageous embodiment of the invention the system comprises means for automatically giving a unique name for the variable, which is designed so that it identifies the resource object that allocates values to the variable and identifies the port at which the resource object outputs the value.

The automatic determination of the inputs and outputs to be connected to one another is made simpler in a further advantageous embodiment of the invention by the port data identifying the associated port as an input port or output port.

A plausibility check for checking resource objects connected to one another can be facilitated in a further advantageous embodiment by the port data identifying the maximum number of further ports with which a port associated with the port data can interchange values. For this purpose, a cardinal number can be introduced as a Meta datum, for example.

The automated connection of the individual resource objects makes possible a further embodiment of the invention in which the system includes means for instantiating the resource objects. As a result, it is possible to form instances of the resource objects during the run time of the simulation program. Accordingly, a user can dynamically instantiate new resource objects and thereby influence a simulation during its execution. For example, the number of the workpieces can be increased by the formation of instances during a simulation of a conveyor installation that is transporting workpieces.

A high level of data consistency is made possible during the project planning stage and the simulation stage of an automation system by the system being embodied in a further advantageous embodiment as an engineering system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained in greater detail below on the basis of the exemplary embodiments shown in the figures, in which.

DETAILED DESCRIPTION OF THE PREFERRED EMBODIMENTS

A very simple example will now be presented below based on FIGS. 1, 2 and 3 to illustrate the inventive automatic connection of two resource objects to write a simulation program in accordance with the invention.

Figure 1:
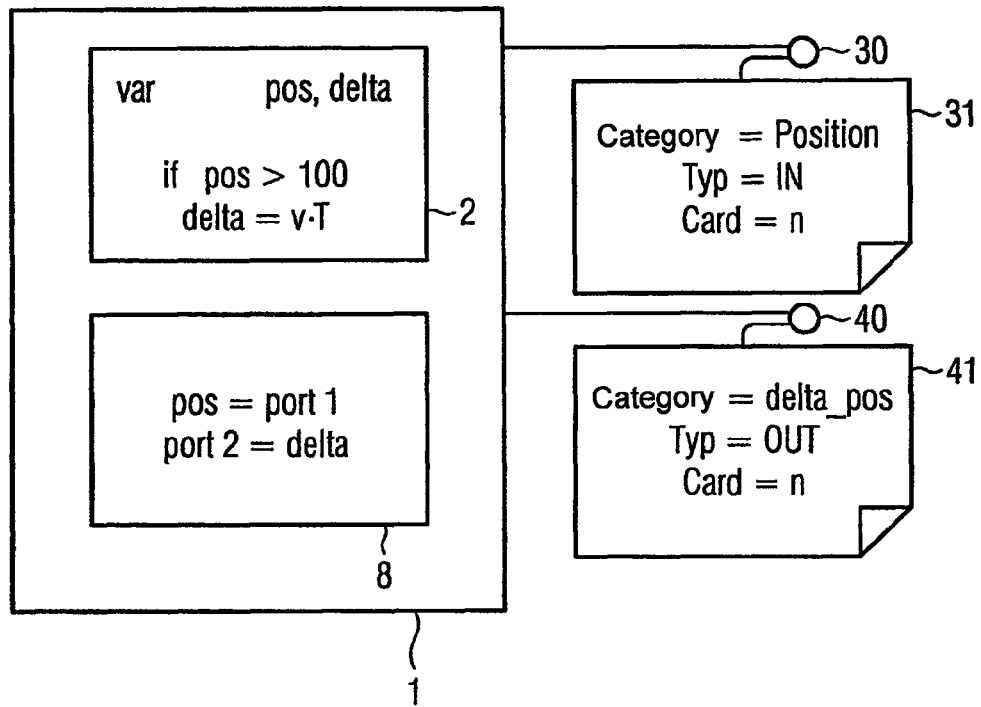
FIG. 1 shows a schematic diagram of a first resource object defined in an engineering system that is assigned to a first component of an automation installation to be simulated in accordance with the invention.

FIG. 1 shows a schematic diagram of a first resource object 1 defined in an engineering system that is assigned to a first component of an automation installation to be simulated. The resource object comprises two ports 30, 40 through which data can be interchanged with other resource objects and which are shown schematically in FIG. 1 as pins.

In addition the resource object 1 is assigned a program fragment 2. The program fragment 2 consists of computer program code with which the behavior of the automation component assigned to the resource object 1 can be simulated during execution in a simulation program.

The resource object 1 is assigned to a conveyor belt of the automation installation. A user of the engineering system thus also allocates the name "conveyor belt" to the resource object 1. The task of the real conveyor belt is to transport workpieces. The program fragment 2 now describes the behavior of the conveyor belt to the extent that it computes for a workpiece that is located at a specific position a distance delta that this workpiece covers within a time T when the conveyor belt is running at the speed v. Here, it is assumed that the workpiece will only be moved by the conveyor belt if the position pos of the workpiece assumes a value greater than 100. This behavior is defined within the program fragment 2 in the form of an actual instruction. Within the program fragment 2 the local variables pos and delta are used which describe the position and the distance. The speed v of the conveyor belt and the time interval T are preassigned static parameters that do not change during the run time of the program fragment 2.

In addition the first resource object 1 comprises a first allocation window 8. Within this allocation window 8, the local variables pos and delta are linked to the values present at the ports 30, 40 of the resource object 1. Accordingly, the local variable pos is assigned the value of 30 at port 1. The position of the workpiece is thus read in at port 1 30. After the distance covered delta has now been calculated with this value, in a first allocation window 8 the second port 40 (port 2) is allocated the value of the variable delta.

From the description of the program fragment 2 and the allocations, it is clearly evident that the first port 30 represents an input of the first resource object 1 and the second port 40 represents an output.

The special feature of the first resource object 1 shown in FIG. 1 now lies in the fact that a quantity of first and second position data 31, 41 is provided that identifies properties of the associated ports 30, 40 or of the values to be interchanged at these ports. Thus, a category is specified for each of these ports 30, 40, on the basis of which the ports 30, 40 can be classified with respect to an especially user-defined categorization. In addition, the type of the associated port 30, 40 is identified in relation to the input or output. Furthermore, a cardinal number card is specified for each port 30, 40. The cardinal number defines the number of further ports with which the associated port can be connected for the purpose of interchanging values.

Based on this port data 31, 41 and port data of further resource objects which describe further components of the automation installation in respect of its behavior, the engineering system can now undertake an automatic logical linkage of the ports and thereby automatically define the data flow paths.

Figure 2:
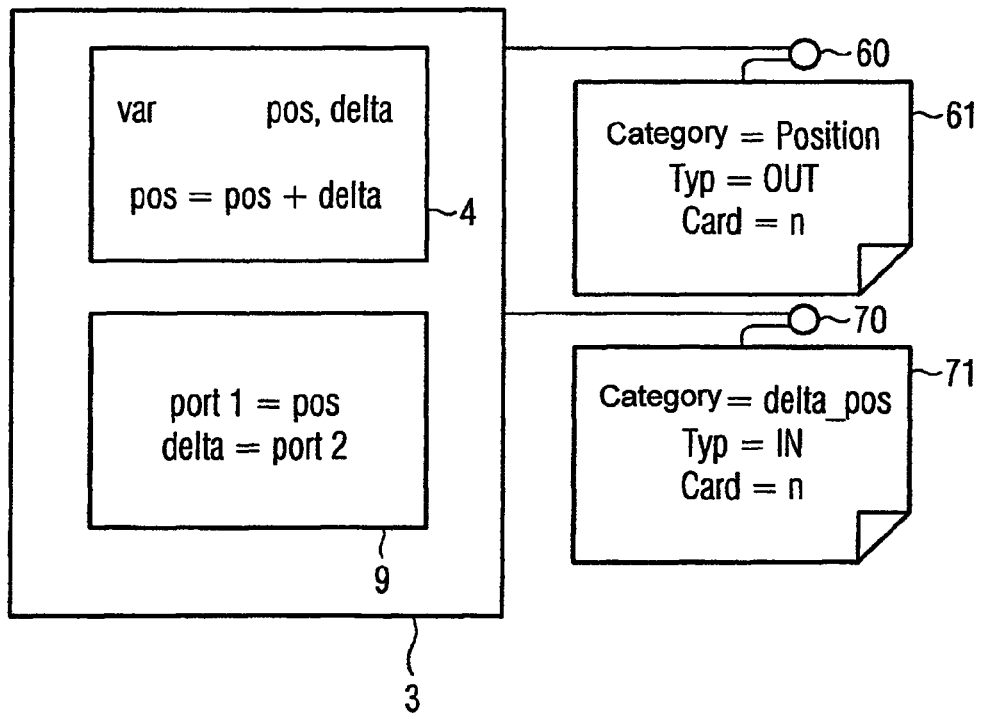
FIG. 2 shows a schematic diagram of a second resource object defined in the engineering system that is assigned to a second component of the automation installation to be simulated in accordance with the invention.

FIG. 2 shows a schematic diagram of a second resource object 3 defined in the engineering system which is assigned to a second component of the automation installation to be simulated. This resource object 3 is assigned to a workpiece to be transported on the conveyor belt and is intended to describe its behavior within a simulation. To this end the second resource object 3 comprises a second program fragment 4 which contains computer program code with which the behavior of the workpiece within the simulation program can be simulated. This program fragment 4 calculates the current position pos of the workpiece based on the change in distance delta which it reads in at one of its ports 60, 70. Thus, two local variables pos and delta are defined within the second program fragment 4 that can be given corresponding values.

In a second allocation window 9, the logical links between the local variables pos and delta and the ports 60, 70 of the second resource object 3 are finally defined. Thus the new position pos calculated with the second program fragment 4 is allocated to port 1. The local variable delta that is needed for the computation is read in at port 70.

Here, the ports 60, 70 are also assigned port data 61, 71, which identifies the properties of the associated ports 60, 70 or of the values to be interchanged at the ports 60, 70. Here, the metadata category, type and cardinal number are also given in a similar way to FIG. 1.

Since the first port 30 of the first resource object 1 belongs to the same category as the first port 60 of the second resource object 3 and the first port 30 of the first resource object 1 is an input and the first port 60 of the second object 3 is an output, the system detects that these two ports 30, 60 are intended for common data interchange. The behavior is the same with the respective second ports 40, 70 which likewise belong to the same category, with the second port 41 of the first resource object 1 being an output and the second port 71 of the second resource object 3 being an input.

The engineering system can thus identify the second resource object 3 from a plurality of resource objects based on the port data 31, 41, 61, 71 in order to connect it for the purposes of interchanging values to the first resource object 1 as previously described. In addition, the engineering system can now integrate the program fragments 2, 4 of the first and second resource object 1, 3 into a simulation program which maps features such as the interaction of components assigned to the two resource objects 1, 3.

Figure 3:
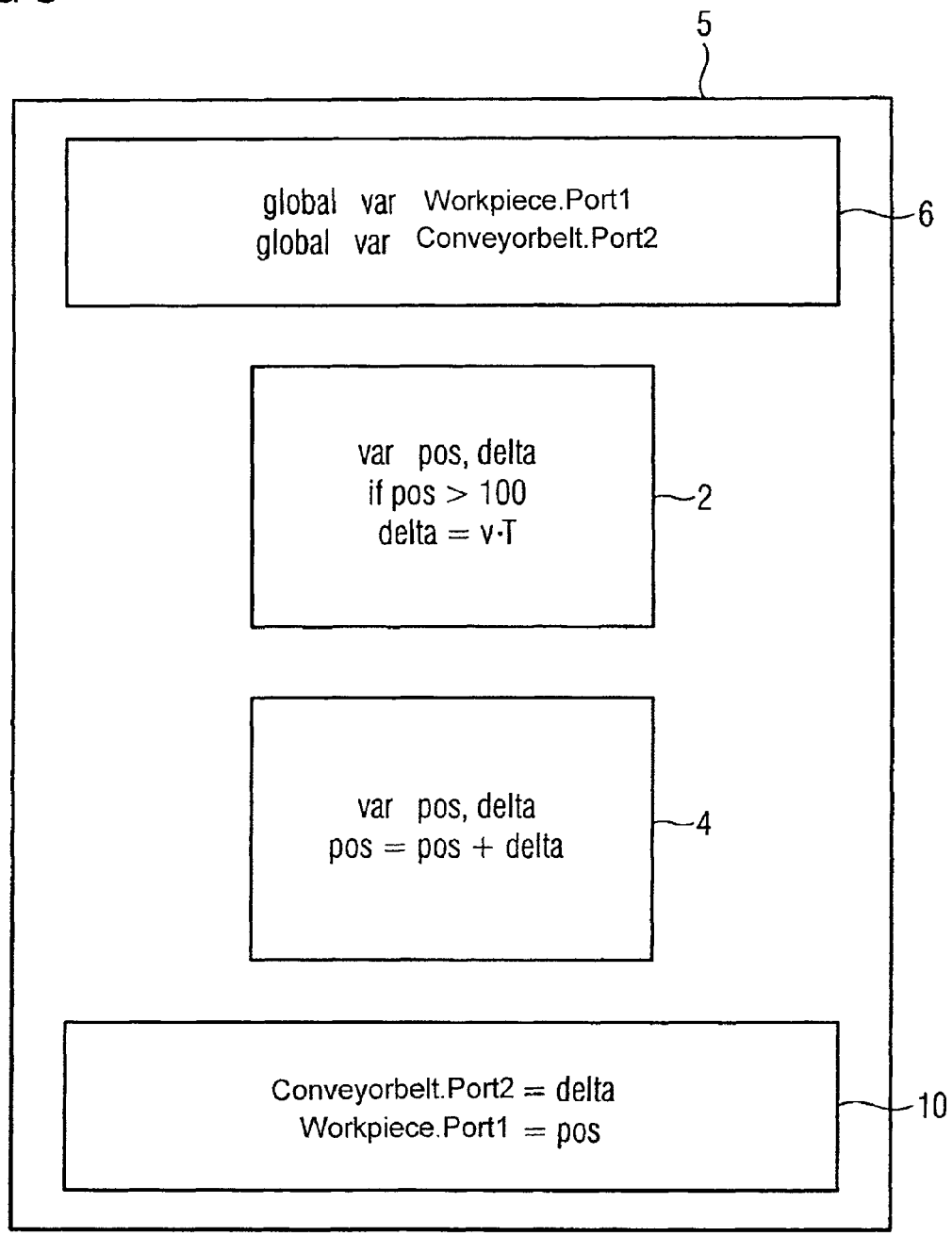
FIG. 3 shows a basic diagram of a simulation program for simulation of the first and second components in accordance with the invention.

FIG. 3 shows a basic diagram of a simulation program 5 for simulating the first and the second components of the automation installation. After the two resource objects 1, 3 have now been identified, the associated program fragments 2, 4 have been integrated into the simulation program 5. In addition, two global variables 6 have been defined which can be assigned the values computed by the program fragments 2, 4. The local variables delta and pos used in the program fragments 2, 4 will finally be mapped in a third allocation window 10 to these globally-defined variables.

The designation of the global variables 6 is undertaken using a degree of automation. This automation ensures that no double naming can occur and the origin of the global variables, i.e. the port at which the value was output, is identifiable. Thus, the resource object at whose port the associated value appears as the output value can be identified based on the name of the global variable and in the final analysis the port itself. For example, the global variable Workpiece port 1 can be assigned the values of the first port 61 of the second resource object 3 since the second resource object 3 is assigned to the workpiece. Similarly the global variable Conveyer belt port 2 can be assigned the value at the second port 40 of the first resource object 1 since the first resource object is assigned to the conveyor belt.

Figure 4:
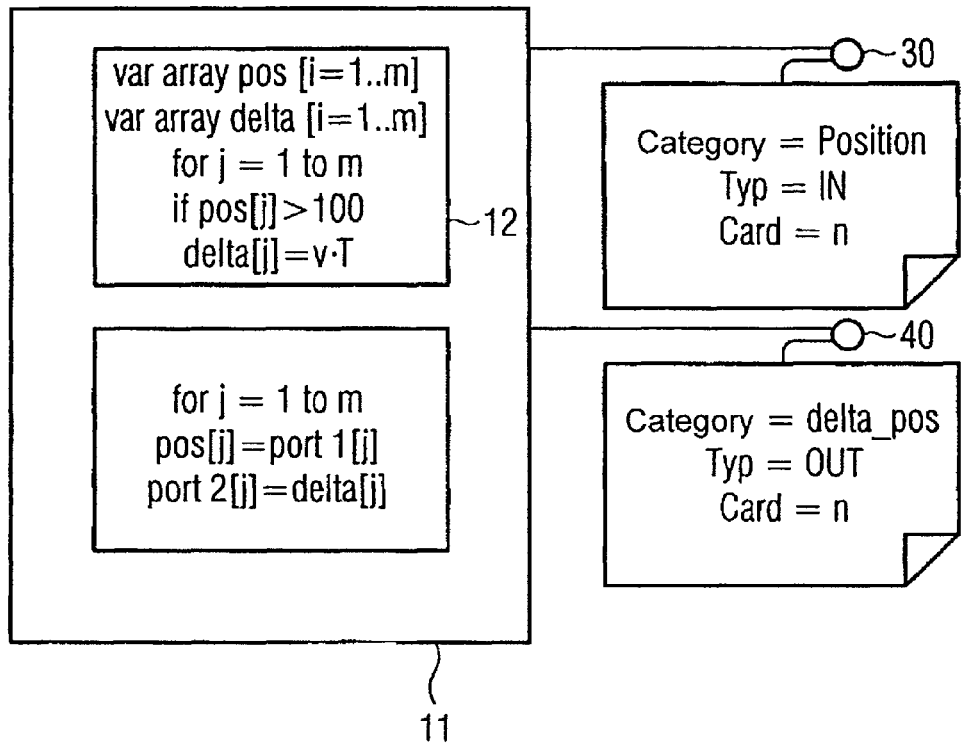
FIG. 4 shows a schematic diagram of a third resource object defined in the engineering system that is assigned to a third component of the automation installation to be simulated in accordance with the invention.

FIG. 4 shows a schematic diagram of a third resource object 11 defined in an engineering system which is assigned to a third component of the automation installation to be simulated. The third resource object 11, similarly to the first resource object 1 of FIG. 1, is assigned to a conveyor belt. In the implementation of the third resource object 11, however, an account has been taken of the fact that the conveyor belt can transport more than one workpiece. Consequently, the associated behavior model can also compute the change in distance of a number of workpieces.

In a program fragment 12 of the third resource object 11, the distance covered by each workpiece is computed in a method similar to that described in relation to FIG. 1. To be able to execute this for each of the workpieces, an array is defined both for the position and also for the distance covered delta, with each array possessing m entries and m designating the number of the workpieces to be transported by the conveyor belt.

By using an array as a variable type, it becomes possible within a simulation cycle to compute and to store the distances covered by all m workpieces. After execution of the third program fragment 12 a delta[j] is able to be read out for the initial position pos[j] for each workpiece j, with j=1 . . . m applying.

Figure 5:
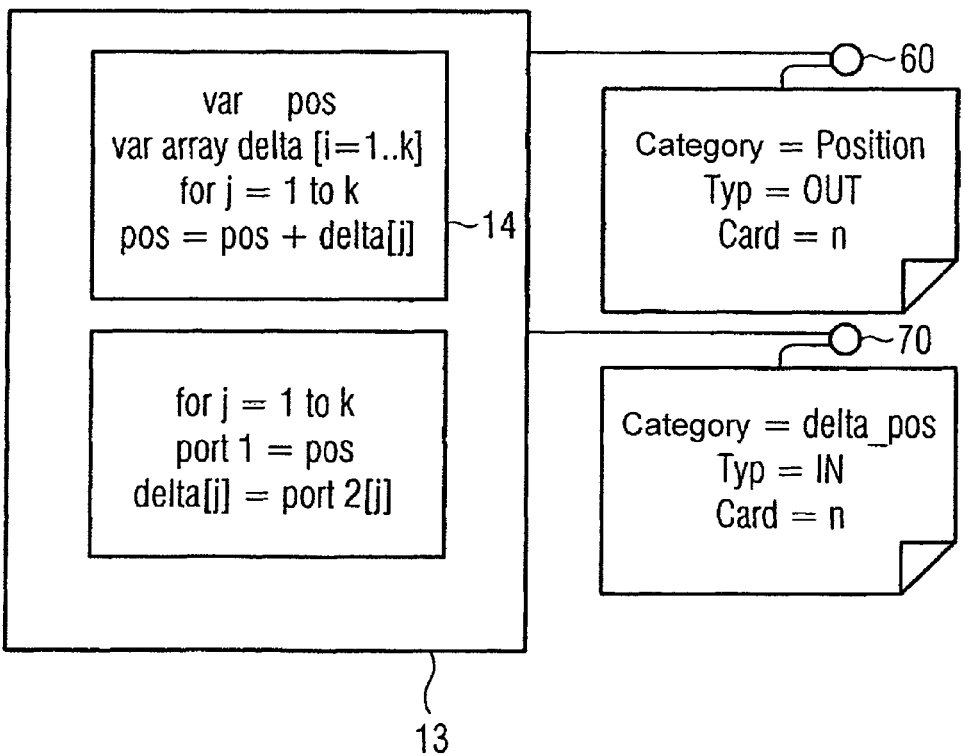
FIG. 5 shows a schematic diagram of a fourth resource object defined in the engineering system that is assigned to a fourth component of the automation installation to be simulated in accordance with the invention.

FIG. 5 shows a schematic diagram of a fourth resource object 13 defined in an engineering system which is assigned to a fourth component of the automation installation to the simulated. The fourth resource object 13 is assigned to a workpiece in a similar way to the second resource object from FIG. 2. In the definition of the fourth resource object 13, however, the case has been considered in which the associated workpiece is moved by a number k of conveyor belts. Because of this, the distance delta has also been defined here in the form of an array since the new position is computed from the incremental shares of all k conveyor belts.

Since the fourth resource object 13 is assigned to precisely one workpiece that can also assume precisely one position, the position pos is defined as a scalar variable.

Figure 6:
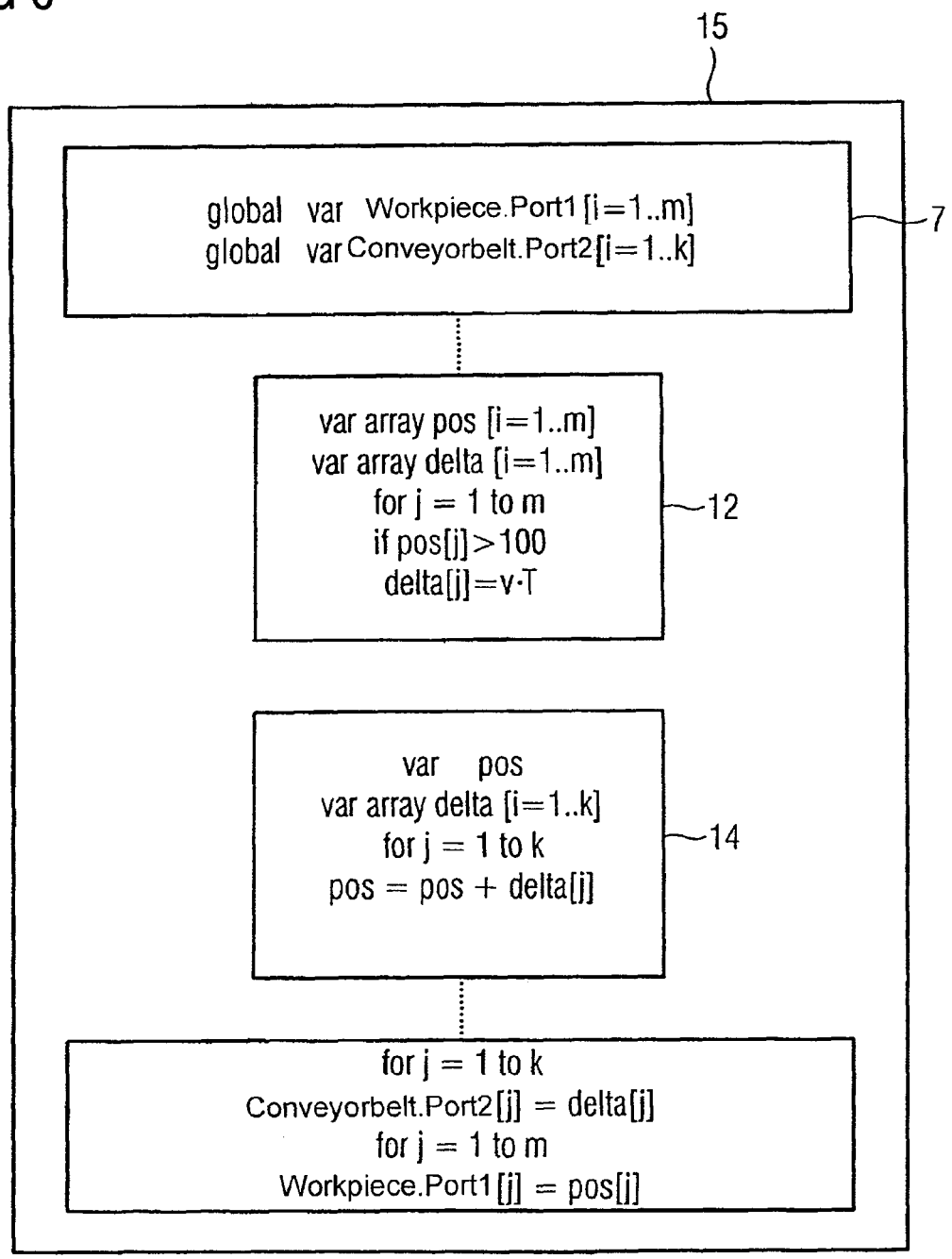
FIG. 6 shows a basic diagram of a further simulation program for simulation of the third and fourth components in accordance with the invention.

FIG. 6 shows a basic diagram of a further simulation program 15 for simulation of the automation installation.

The integration of the program fragments 12, 14 of the third and fourth resource object 11, 13 is performed in a similar manner to the procedure presented in FIG. 3. As well as the explicitly shown program fragments 12, 14 of the third and fourth resource object 11, 13, the program fragments of the remaining k conveyor belts and m workpieces are integrated into the finished simulation program 15.

In order to make it possible for all these program fragments 12, 14 to interchange data with each other, globally-defined arrays 7 Workpiece port 1 and Conveyor belt port 2 are declared. The name is chosen using the same procedure as that already explained under FIG. 3. The output value to be interchanged within a simulation cycle and calculated by the program fragments can be stored within the globally-defined arrays, without said the values being able to be overwritten within the said cycle.

The exemplary embodiment described with FIGS. 4 to 6 shows that the invention allows a much clearer connection of individual behavior models for simulation of the automation installation than would be the case in the prior art. In accordance with the prior art, the ports of all workpiece resources would have to be linked to the ports of all conveyor belts that are involved in the transport of the workpieces in one graphical user interface. In this case, it is obvious that the danger of errors is very high and that a very unclear representation of the system model is produced. These disadvantages are efficiently overcome with system in accordance with the disclosed embodiments of the invention. Furthermore, the invention makes possible a dynamic instantiation during the simulation run. For example, new instances of a particular type of workpiece to which the fourth resource object 13 is assigned can be created during a simulation.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for writing a simulation program for simulating an automation installation, comprising:
   means for defining a respective resource object for a plurality of components of the automation installation, each defined respective resource object of said plural components being assigned a program fragment including computer program code for simulation of a functionality of an associated component of said plural components and each respective resource object having at least one port with a value which is at least one of assignable and read in by the program fragment of the associated resource object;
   means for defining port data for each of the at least one port, the defined port data defining properties of values being interchangeable at an associated port of the at least one port;
   means for identifying a first port of a first resource object which is provided for interchanging values with a second port of a second resource object based on the defined port data belonging to the first and the second port;
   means for defining precisely one variable which can be occupied by the values to be interchanged between the first and second port; and
   means for integrating program fragments assigned to the first and second resource object into the simulation program and for occupying variables with the values to be interchanged between the first and second port.

2. The system as claimed in claim 1, wherein the variable comprises a global variable.

3. The system as claimed in claim 1, wherein the variable comprises a globally-defined array.

4. The system as claimed in claim 1, wherein the variable comprises a pointer.

5. The system as claimed in claim 1, wherein the variable comprises a list.

6. The system as claimed in claim 1, further comprising:
   means for automatically issuing a unique name for the variable which is configured such that the variable identifies the respective resource object which provides the variable values, and identifies the at least one port at which the respective resource object outputs the value.

7. The system as claimed in claim 1, wherein the at least one port data identifies a respective associated port of the at least one port as an input port or an output port.

8. The system as claimed in claim 1, wherein the port data identifies a maximum number of further ports with which a port belonging to the port data can interchange values.

9. The system as claimed in claim 1, further comprising:
   means for instantiating each defined respective resource object which facilitates formation of instances of the defined respective resource object at runtime of the simulation program.

10. The system as claimed in claim 1, wherein the system comprises an engineering system.

* * * * *